United States Patent
Stack et al.

(10) Patent No.: US 10,047,676 B2
(45) Date of Patent: Aug. 14, 2018

(54) ELECTRONIC MODULE MOUNTING TO VIBRATION ISOLATING STRUCTURE

(71) Applicant: United Technologies Corporation, Farmington, CT (US)

(72) Inventors: Joseph Stack, Lenexa, KS (US); Jesse M. Chandler, South Windsor, CT (US); Gabriel L. Suciu, Glastonbury, CT (US); Kurt J. Sobanski, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 296 days.

(21) Appl. No.: 15/137,561

(22) Filed: Apr. 25, 2016

(65) Prior Publication Data

US 2017/0306850 A1 Oct. 26, 2017

(51) Int. Cl.
*F02C 1/00* (2006.01)
*F02C 7/24* (2006.01)
(Continued)

(52) U.S. Cl.
CPC ............ *F02C 7/24* (2013.01); *F02C 3/04* (2013.01); *F02C 7/20* (2013.01); *F02C 7/25* (2013.01); *F05D 2220/32* (2013.01)

(58) Field of Classification Search
CPC ...... F02C 3/04; F02C 7/20; F02C 7/24; F02C 7/25; F05D 2220/32
See application file for complete search history.

(56) References Cited

U.S. PATENT DOCUMENTS 3,146,052 A * 8/1964 Burch .................. H01R 13/741
 174/153 R
5,174,110 A * 12/1992 Duesler ..................... F02C 7/32
 138/111
(Continued)

FOREIGN PATENT DOCUMENTS

EP 1308611 A2 5/2003
EP 2543589 A1 1/2013
(Continued)

OTHER PUBLICATIONS

Extended European Search Report for EP Application No. 17167943.4; Report dated Sep. 21, 2017 (6 pages).

*Primary Examiner* — Jesse Bogue
(74) *Attorney, Agent, or Firm* — Cantor Colburn LLP

(57) ABSTRACT

An electromechanical component arrangement for a gas turbine engine includes a mechanical component located at a first side of a firewall. An electronic module assembly of the electromechanical component is connected to the mechanical component and includes a housing, a mounting frame located in the housing and an electronic module secured to the mounting frame. The electronic module is operably connected to the mechanical component via a module cable. A vibration isolator is located in the housing to locate and support the mounting frame therein. The vibration isolator is configured to vibrationally isolate the electronic module from gas turbine engine vibrations. A cover plate is secured to the housing and the first side of the firewall, while the housing extends from the cover plate through a module opening in the firewall to a second side of the firewall having a lower operating temperature than the first side.

20 Claims, 3 Drawing Sheets

(51) Int. Cl.
    *F02C 3/04*         (2006.01)
    *F02C 7/20*         (2006.01)
    *F02C 7/25*         (2006.01)

(56) References Cited

U.S. PATENT DOCUMENTS

| | | | | |
|---|---|---|---|---|
| 6,802,479 | B2 * | 10/2004 | Howe | B64D 37/00 |
| | | | | 244/129.1 |
| 7,828,298 | B2 * | 11/2010 | Cummings | A62C 2/06 |
| | | | | 277/502 |
| 9,334,805 | B2 * | 5/2016 | Takeuchi | F02C 7/25 |
| 9,478,896 | B2 * | 10/2016 | Fitt | H01R 13/518 |
| 2003/0126854 | A1 * | 7/2003 | Cazenave | F01D 9/065 |
| | | | | 60/226.1 |
| 2008/0156089 | A1 | 7/2008 | Smith | |
| 2015/0101331 | A1 * | 4/2015 | Goulds | F02C 3/14 |
| | | | | 60/722 |

FOREIGN PATENT DOCUMENTS

| | | | |
|---|---|---|---|
| EP | 2860412 | A1 | 4/2015 |
| FR | 2960912 | A1 | 12/2011 |

* cited by examiner

ELECTRONIC MODULE MOUNTING TO VIBRATION ISOLATING STRUCTURE

BACKGROUND

This disclosure relates to gas turbine engines, and more particularly to the thermal protection of electrical components of gas turbine engines.

Electrical components are by their nature sensitive to temperature and thermal cycling. As a result, it is desired to keep the electrical components relatively cool and within a small temperature range in order to function properly and to extend the useful service life of the electrical components. Many mechanical system components such a pumps, actuators, valves, or the like are driven by electrical motors, and while the mechanical portion of the component may be able to withstand high operating temperatures, the electrical portions of the components, such as a motor, controller and other portions, must be kept relatively cool to maintain their useful service life. In a typical gas turbine engine, a "firewall" is defined that divides a "cold side" of the gas turbine engine where temperatures are typically below 160 degrees Fahrenheit from a "hot side" of the gas turbine engine where operating temperatures are often in the range of about 160 degrees to 600 degrees Fahrenheit or higher. Problems arise when it is desired or necessary to locate a mechanical component with necessary electrical portions such as a motor or a controller on the "hot side" of the firewall.

SUMMARY

In one embodiment, an electromechanical component arrangement for a gas turbine engine includes a mechanical component located at a first side of a firewall of a gas turbine engine. An electronic module assembly of the electromechanical component is connected to the mechanical component and includes a housing, a mounting frame located in the housing and an electronic module secured to the mounting frame. The electronic module is operably connected to the mechanical component via a module cable. A vibration isolator is located in the housing to locate and support the mounting frame therein. The vibration isolator is configured to vibrationally isolate the electronic module from gas turbine engine vibrations. A cover plate is secured to the housing. The cover plate is secured to the first side of the firewall, while the housing extends from the cover plate through a module opening in the firewall to a second side of the firewall, the second side having a lower operating temperature than the first side.

Additionally or alternatively, in this or other embodiments the electronic module is operably connected to one or more of an electrical controller or an electrical motor located at the second side of the firewall.

Additionally or alternatively, in this or other embodiments the housing further includes a connection hub to operably connect the electronic module to the one or more of the electrical controller or the electrical motor.

Additionally or alternatively, in this or other embodiments the vibration isolator is one or more of a spring, an elastomeric damper, an air cylinder/piston arrangement or an oil filled cylinder/piston arrangement.

Additionally or alternatively, in this or other embodiments the electronic module is configured to collect data from the mechanical component relating to the service life and/or operation of the mechanical component.

Additionally or alternatively, in this or other embodiments an electrical motor is located at the second side of the firewall and is operably connected to the mechanical component via a coupling extending through the firewall at a coupling opening, separate and distinct from the module opening.

Additionally or alternatively, in this or other embodiments an electrical controller is located at the second side and is operably connected to the electronic module and the electrical motor to control the electrical motor utilizing input from the electronic module.

Additionally or alternatively, in this or other embodiments the electronic module assembly is inseparably affixed to the mechanical component to remain connected to the mechanical component for the entire service life of the mechanical component.

Additionally or alternatively, in this or other embodiments the first side has an operating temperature greater than 160 degrees Fahrenheit.

Additionally or alternatively, in this or other embodiments the firewall is located axially upstream of a high pressure compressor section of the gas turbine engine, the first side located axially downstream of the firewall.

In another embodiment an electromechanical system for a gas turbine engine includes a mechanical component located at a first side of a firewall of a gas turbine engine, and an electrical motor located at a second side of the firewall, the second side having a lower operating temperature than the first side. The electrical motor is operably connected to the mechanical component via a coupling extending through a coupling opening in the firewall and configured to drive the mechanical component. An electronic module assembly is inseparably connected to the mechanical component and includes a housing, a mounting frame located in the housing, and an electronic module secured to the mounting frame. The electronic module is operably connected to the mechanical component via a module cable. A vibration isolator is located in the housing to locate and support the mounting frame therein. The vibration isolator is configured to vibrationally isolate the electronic module from gas turbine engine vibrations. A cover plate is secured to the housing. The cover plate is secured to the first side of the firewall, while the housing extends from the cover plate through a module opening in the firewall to the second side of the firewall.

Additionally or alternatively, in this or other embodiments the electronic module is operably connected to an electrical controller located at the second side of the firewall, the electrical controller configured to control the electrical motor utilizing input from the electronic module.

Additionally or alternatively, in this or other embodiments the housing further includes a connection hub to operably connect the electronic module to the electrical controller.

Additionally or alternatively, in this or other embodiments the vibration isolator is one or more of a spring, an elastomeric damper, an air cylinder/piston arrangement or an oil filled cylinder/piston arrangement.

Additionally or alternatively, in this or other embodiments the electronic module is configured to collect data from the mechanical component relating to the service life and/or operation of the mechanical component.

Additionally or alternatively, in this or other embodiments the data is one or more of operating speeds, temperatures, pressures, flow, vibration, proximity, position, current or operational time of the mechanical component, or operational time of the mechanical component. Any other sensors not listed that measure physical states would also be applicable.

Additionally or alternatively, in this or other embodiments the mechanical component is one of an actuator or a pump.

Additionally or alternatively, in this or other embodiments the first side has an operating temperature greater than 160 degrees Fahrenheit.

In yet another embodiment, a gas turbine engine includes a high pressure compressor, a combustor in operable communication with the high pressure compressor and a firewall located axially upstream of the high pressure compressor. The firewall defines a first side axially downstream of the firewall and a second side axially upstream of the firewall. The second side has a lower operating temperature than the first side. An electromechanical system includes a mechanical component located at the first side and an electrical motor located at the second side. The electrical motor is operably connected to the mechanical component via a coupling extending through a coupling opening in the firewall and is configured to drive the mechanical component. An electronic module assembly is inseparably connected to the mechanical component and includes a housing, a mounting frame located in the housing, and an electronic module secured to the mounting frame. The electronic module is operably connected to the mechanical component via a module cable. A vibration isolator is located in the housing to locate and support the mounting frame therein. The vibration isolator is configured to vibrationally isolate the electronic module from gas turbine engine vibrations. A cover plate is secured to the housing. The cover plate is secured to the first side of the firewall, while the housing extends from the cover plate through a module opening in the firewall to a second side of the firewall, the second side having a lower operating temperature than the first side.

Additionally or alternatively, in this or other embodiments the vibration isolator is one or more of a spring, an elastomeric damper, an air cylinder/piston arrangement or an oil filled cylinder/piston arrangement.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
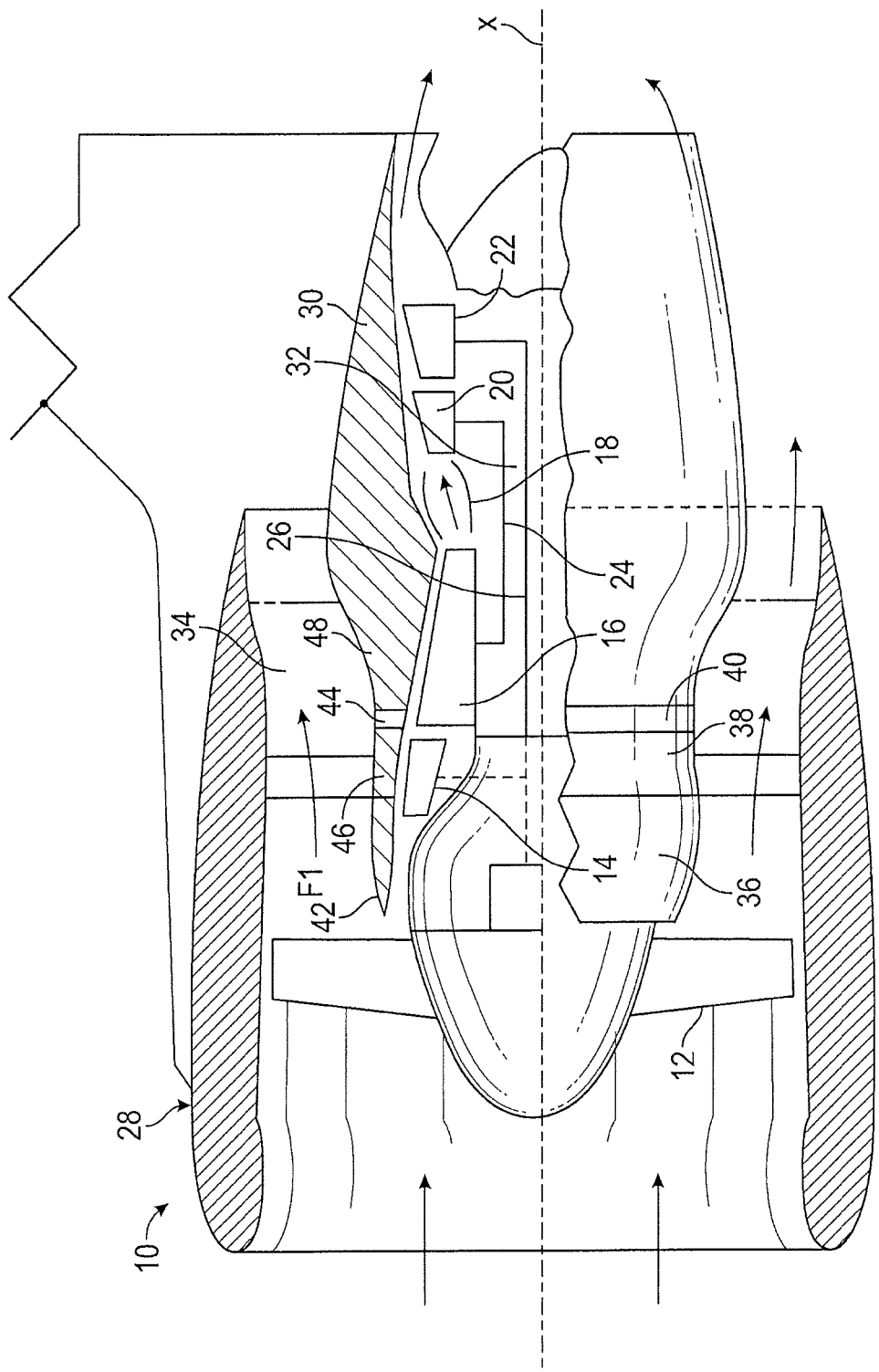
FIG. 1 illustrates a schematic cross-sectional view of an embodiment of a gas turbine engine.

FIG. 1 is a schematic illustration of a gas turbine engine 10. The gas turbine engine generally has includes fan section 12, a low pressure compressor 14, a high pressure compressor 16, a combustor 18, a high pressure turbine 20 and a low pressure turbine 22. The gas turbine engine 10 is circumferentially disposed about an engine centerline X. During operation, air is pulled into the gas turbine engine 10 by the fan section 12, pressurized by the compressors 14, 16, mixed with fuel and burned in the combustor 18. Hot combustion gases generated within the combustor 18 flow through high and low pressure turbines 20, 22, which extract energy from the hot combustion gases.

In a two-spool configuration, the high pressure turbine 20 utilizes the extracted energy from the hot combustion gases to power the high pressure compressor 16 through a high speed shaft 24, and the low pressure turbine 22 utilizes the energy extracted from the hot combustion gases to power the low pressure compressor 14 and the fan section 12 through a low speed shaft 26. The present disclosure, however, is not limited to the two-spool configuration described and may be utilized with other configurations, such as single-spool or three-spool configurations.

Gas turbine engine 10 is in the form of a high bypass ratio turbine engine mounted within a nacelle or fan casing 28 which surrounds an engine casing 30 housing a engine core 32. A significant amount of air pressurized by the fan section 12 bypasses the engine core 32 for the generation of propulsive thrust. The airflow entering the fan section 12 may bypass the engine core 32 via a fan bypass passage 34 extending between the fan casing 28 and the engine casing 30 for receiving and communicating a discharge flow F1. The high bypass flow arrangement provides a significant amount of thrust for powering an aircraft.

The engine casing 30 generally includes an inlet case 36, a low pressure compressor case 38, and an intermediate case 40. The inlet case 36 guides air to the low pressure compressor case 38, and via a splitter 42 also directs air through the fan bypass passage 34.

The gas turbine engine 10 further includes a firewall 44, defined to separate a relatively high temperature portion of the gas turbine engine 10, where operating temperatures may be in the range of 160 degrees to 600 degrees Fahrenheit or higher, from a relatively low temperature portion of the gas turbine engine 10, where operating temperatures are less than about 160 degrees Fahrenheit. In the embodiment of FIG. 1, the firewall 44 is located between the low pressure compressor 14 and the high pressure compressor 16, separating a cold side 46 of the gas turbine engine 10 where operating temperatures are less than about 160 degrees Fahrenheit, from a hot side 48 of the gas turbine engine 10, where operating temperatures may be in the range of 200 degrees to 600 degrees Fahrenheit or higher. The hot side 48 includes engine areas and components axially downstream of the firewall 44, while the cold side 46 includes engine areas and components axially upstream of the firewall 44.

Figure 2:
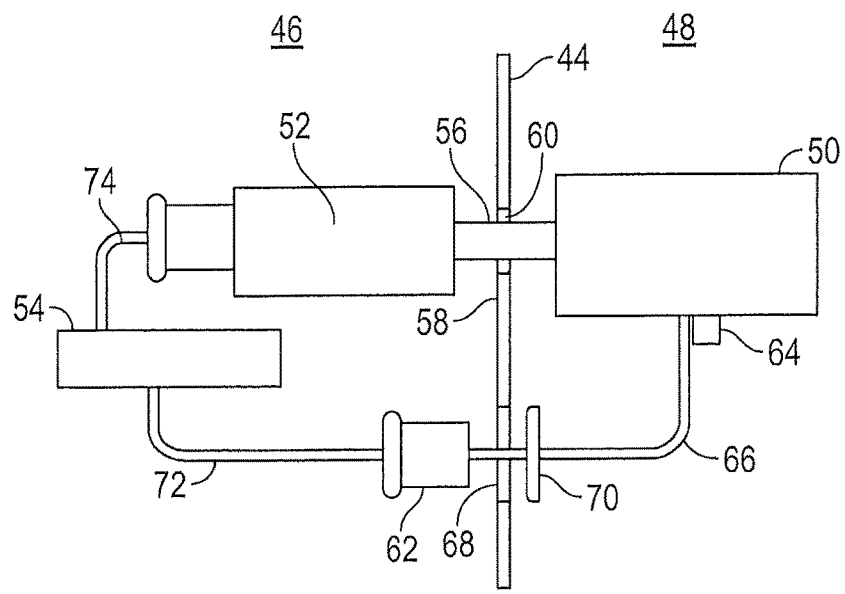
FIG. 2 illustrates a schematic view of an embodiment of a component arrangement at a firewall of a gas turbine engine.

Referring now to FIG. 2, the gas turbine engine 10 includes many mechanical components 50 or devices such as actuators, pumps or the like, and many of these mechanical components 50 utilize electrical components, such as electrical motors 52 and/or electrical controllers 54 to enable or control operation of the mechanical components 50. It is often desired or necessary to locate such mechanical components 50 at the hot side 48 of the firewall 44, but care must be taken to protect the electrical components from the high operating temperatures of the hot side 48.

Shown in FIG. 2 is an embodiment of an arrangement in which the mechanical component 50, such as an actuator or pump, is located at the hot side 48 of the firewall 44. A coupling 56, such as a shaft extends from the mechanical component 50 through a coupling opening 58 in the firewall 44 and connects to the electrical motor 52, located at the cold side 46 of the firewall 44. A coupling seal 60 may be located at the coupling opening 58 to seal between the coupling opening 58 and the coupling 56 to prevent migration of hot gases from the hot side 48 to the cold side 46 through the coupling opening 58. The mechanical component 50 includes an electronic module 62 at which collects data relating to the service life and operation of the mechanical component 50 is stored. The data may include recorded operating speeds, temperatures, pressures, flow, operational times or the like and may include data measured by one or more sensors 64 at the mechanical component 50. The electronic module 62 is inseparably secured to the mechanical component 50 to remain with the mechanical component 50 through the lifespan of the mechanical component 50. Data collected at the electronic module 62 will remain with the mechanical component 50 even when the mechanical component 50 is removed from the gas turbine engine 10 for service, repair or replacement.

The electronic module 62 receives power from the electrical controller 54 and converts analog signals from cable 66 into digital signals for transmission to the electrical controller 54 through a controller cable 72. The electronic module 62 may include any combination of a power conditioning function, processing unit, memory, analog to digital converters, analog interface circuits and a digital bus interface for communication. Other circuits that interface devices in the mechanical component 50 may also be included in the electronic module 62.

To protect the electronic module 62 from the high operating temperatures of the hot side 48 and to preserve the integrity of the data collected at the electronic module 62, the electronic module 62 is located at the cold side 46 during operation of the gas turbine engine 10. To accomplish this, the electronic module 62 is connected to the mechanical component 50 via a module cable 66, which permanently joins the electronic module 62 to the mechanical component 50. With the mechanical component 50 installed at the hot side 48, the electronic module 62 is passed through a module opening 68 in the firewall 44 from the hot side 48 to the cold side 46. A cover plate 70, which may be installed around the module cable 66 or integral to the module cable 66 covers and seals the module opening 68 from the hot side 48 to prevent hot gas egress from the hot side 48 to the cold side 46 via the module opening 68. Once in place at the cold side 46, the electronic module 62 is connected to one or more components on the cold side 46 such as the electrical controller 54 via the controller cable 72 to provide communication between the mechanical component 50 and the electrical controller 54 so the electrical controller 54 may provide commands to the electrical motor 52 via motor cable 74 to, for example, adjust output of the electrical motor 52 based on data feedback from the mechanical component 50 and/or the electronic module 62. While the controller cable 72 and motor cable 74 are illustrated in FIG. 2, it is to be appreciated that in other embodiments, the controller cable 72 may be omitted and the electronic module 62 may be directly connected to the electrical controller 54. Likewise, in some embodiments the electrical motor 52 may be directly connected to the electrical controller 54, with the motor cable 74 omitted. Also, while the electronic module 62 in the embodiment of FIG. 2 is connected to the electrical controller 54, it is to be appreciated that in other embodiments, the electronic module 62 may be connected to the electrical motor 52 or another electrical or mechanical component. Further, the electronic module 62 may be fixed in place to, for example, the cover plate 70, the firewall 44 or other structure of the gas turbine engine 10.

Figure 3:
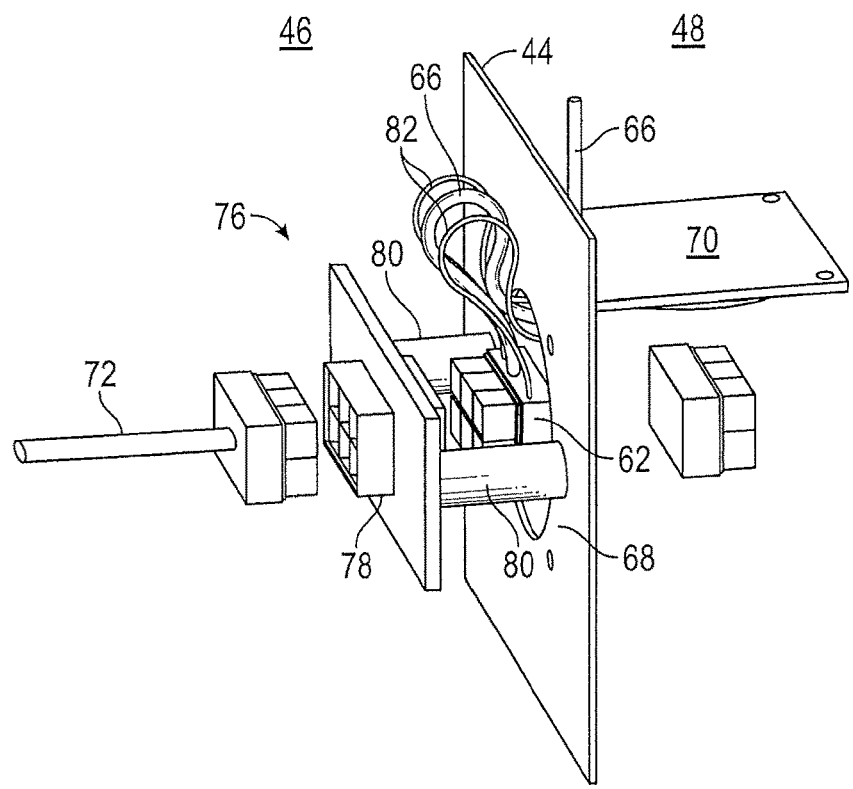
FIG. 3 illustrates a schematic perspective view of an embodiment of a component connection arrangement at a firewall of a gas turbine engine.

Referring now to FIG. 3, in some embodiments it is desired to protect or isolate the electronic module 62 from high frequency vibrations that occur during operation of the gas turbine engine 10, which may be transmitted through the firewall 44 or cover plate 70. FIG. 3 illustrates a vibration isolation structure 76 to which the electronic module 62 is secured, and connected to the controller cable 72. The vibration isolation structure 76 includes a connection hub 78 at which the electronic module 62 is connected to, for example, the controller cable 72. The connection hub 78 is spaced from and connected to the firewall 44, or other structure of the gas turbine engine 10, by one or more vibration isolators 80, such as springs, dampers such as elastomeric dampers, and/or other vibration absorbing or damping element such as an air cylinder/piston arrangement or an oil filled cylinder/piston arrangement. While two vibration isolators 80 are shown in FIG. 3, it is to be appreciated that other quantities of vibration isolators 80, for example, one, three, four or more vibration isolators 80 may be utilized. The vibration isolators 80 are configured such that transmission of gas turbine engine 10 high frequency vibrations from the firewall 44 to the electronic module 62 is reduced or prevented.

To further prevent vibration transmission to the electronic module 62, the module cable 66 extending from the cover plate 70 to the electronic module 62 is in a slack condition (not taut) after the electronic module 62 is installed at the connection hub 78 and the cover plate 70 is installed to the firewall 44. Cable springs 82 may extend from the cover plate to the electronic module 62 to further dampen vibration which may be transmitted through the module cable 68.

Figure 4:
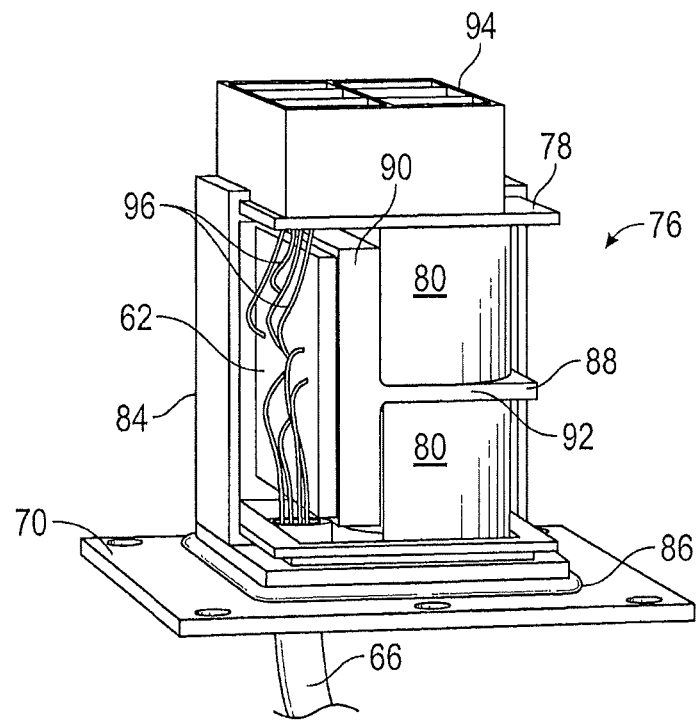
FIG. 4 illustrates a schematic view of another embodiment of a component connection arrangement at a firewall of a gas turbine engine.
Figure 5:
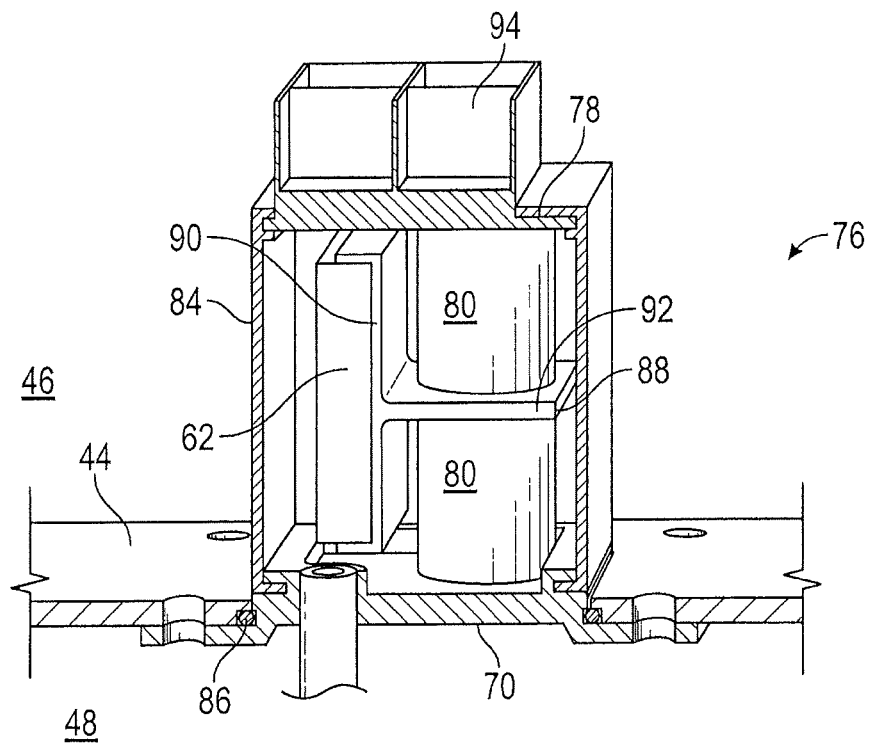
FIG. 5 illustrates another schematic view of the embodiment of FIG. 4.

Another embodiment of a vibration isolation structure 76 is shown in FIGS. 4 and 5. The vibration isolation structure 76 includes a housing 84 fixed to the cover plate 70 with, in some embodiments, a seal 86 interposed between the housing 84 and the cover plate 70. A mounting frame 88 is located in the housing 84 with the electronic module 62 secured to a first leg 90 of the mounting frame 88. The mounting frame 88 includes a leg 92, which in some embodiments is perpendicular to the first leg 90. In some embodiments, the mounting frame 88 is substantially T-shaped. The mounting frame 88 is supported in the housing 84 by one or more vibration isolators 80 connected to the housing 84 and to the mounting frame 88. The vibration isolators 80 support the mounting frame 88 in the housing 84 while allowing for relative vibratory motion of the mounting frame 88 and electronic module 62 relative to the housing 84 and the cover plate 70. Gas turbine engine 10 vibrations transmitted through the firewall 44 and cover plate 70 into the housing 84 are dampened by the vibration isolators 80 so transmission to the electronic module 62 is reduced or prevented. To allow for the relative vibratory motion of the cover plate 70 relative to the electronic module 62, the module cable 66 may have a slack (not taut) condition when the cover plate 70 is installed to the firewall 44 to prevent vibration transmission through the module cable 66 to the electronic module 62.

To connect the electronic module 62 to the controller cable 72 or other component, the connection hub 78 is located at the housing 84, providing a connector 94 for connecting the controller cable 72. The electronic module 62 is connected to the connector 94 of the connection hub 78 via an intermediate cable 96, which also may have a slack (not taut) condition to allow for relative vibratory motion between the housing 84 and the electronic module 62, thus preventing vibration transmission through the intermediate cable 96 to the electronic module 62.

The embodiment of FIGS. 4 and 5, including the housing 84 with the electronic module 62 located inside of the housing 84, provides additional protection of the electronic module 62 from damage or contamination, both when installed at the gas turbine engine 10 and when not installed at the gas turbine engine 10. Further, the housing 84 provides a rigid structure to ensure that when the housing 84 is installed through the firewall 44, a secure connection is made with the mating component, for example, the controller cable 72.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An electromechanical component arrangement for a gas turbine engine, comprising:
   a mechanical component disposed at a first side of a firewall of a gas turbine engine;
   an electronic module assembly of the electromechanical component connected to the mechanical component and including:
   a housing;
   a mounting frame disposed in the housing;
   an electronic module secured to the mounting frame, the electronic module operably connected to the mechanical component via a module cable;
   a vibration isolator disposed in the housing to locate and support the mounting frame therein, the vibration isolator configured to vibrationally isolate the electronic module from gas turbine engine vibrations; and
   a cover plate secured to the housing, the cover plate secured to the first side of the firewall, while the housing extends from the cover plate through a module opening in the firewall to a second side of the firewall, the second side having a lower operating temperature than the first side.

2. The electromechanical component arrangement of claim 1, wherein the electronic module is operably connected to one or more of an electrical controller or an electrical motor disposed at the second side of the firewall.

3. The electromechanical component arrangement of claim 2, the housing further comprising a connection hub to operably connect the electronic module to the one or more of the electrical controller or the electrical motor.

4. The electromechanical component arrangement of claim 1, wherein the vibration isolator is one or more of a spring, an elastomeric damper, an air cylinder/piston arrangement or an oil filled cylinder/piston arrangement.

5. The electromechanical component arrangement of claim 1, wherein the electronic module is configured to collect data from the mechanical component relating to the service life and/or operation of the mechanical component.

6. The electromechanical component arrangement of claim 1, further comprising an electrical motor disposed at the second side of the firewall and operably connected to the mechanical component via a coupling extending through the firewall at a coupling opening, separate and distinct from the module opening.

7. The electromechanical component arrangement of claim 6, further comprising an electrical controller disposed at the second side and operably connected to the electronic module and the electrical motor to control the electrical motor utilizing input from the electronic module.

8. The electromechanical component arrangement of claim 1, wherein the electronic module assembly is inseparably affixed to the mechanical component to remain connected to the mechanical component for the entire service life of the mechanical component.

9. The electromechanical component arrangement of claim 1, wherein the first side has an operating temperature greater than 160 degrees Fahrenheit.

10. The electromechanical component arrangement of claim 1, wherein the firewall is disposed axially upstream of a high pressure compressor section of the gas turbine engine, the first side disposed axially downstream of the firewall.

11. An electromechanical system for a gas turbine engine comprising:
    a mechanical component disposed at a first side of a firewall of a gas turbine engine;
    an electrical motor disposed at a second side of the firewall, the second side having a lower operating temperature than the first side, the electrical motor operably connected to the mechanical component via a coupling extending through a coupling opening in the firewall and configured to drive the mechanical component;
    an electronic module assembly inseparably connected to the mechanical component and including:
    a housing;
    a mounting frame disposed in the housing;
    an electronic module secured to the mounting frame, the electronic module operably connected to the mechanical component via a module cable;
    a vibration isolator disposed in the housing to locate and support the mounting frame therein, the vibration isolator configured to vibrationally isolate the electronic module from gas turbine engine vibrations; and
    a cover plate secured to the housing, the cover plate secured to the first side of the firewall, while the housing extends from the cover plate through a module opening in the firewall to the second side of the firewall.

12. The electromechanical system of claim 11, wherein the electronic module is operably connected to an electrical controller disposed at the second side of the firewall, the electrical controller configured to control the electrical motor utilizing input from the electronic module.

13. The electromechanical system of claim 12, the housing further comprising a connection hub to operably connect the electronic module to the electrical controller.

14. The electromechanical system of claim 12, wherein the vibration isolator is one or more of a spring, an elastomeric damper, an air cylinder/piston arrangement or an oil filled cylinder/piston arrangement.

15. The electromechanical system of claim 12, wherein the electronic module is configured to collect data from the mechanical component relating to the service life and/or operation of the mechanical component.

16. The electromechanical system of claim 15, wherein the data is one or more of operating speeds, temperatures, pressures, flow, vibration, proximity, position, current or operational time of the mechanical component.

17. The electromechanical system of claim 12, wherein the mechanical component is one of an actuator or a pump.

18. The electromechanical component arrangement of claim 12, wherein the first side has an operating temperature greater than 160 degrees Fahrenheit.

19. A gas turbine engine comprising:
a high pressure compressor;
a combustor in operable communication with the high pressure compressor;
a firewall disposed axially upstream of the high pressure compressor, the firewall defining a first side axially downstream of the firewall and a second side axially upstream of the firewall, the second side having a lower operating temperature than the first side; and
an electromechanical system including:
a mechanical component disposed at the first side;
an electrical motor disposed at the second side, the electrical motor operably connected to the mechanical component via a coupling extending through a coupling opening in the firewall and configured to drive the mechanical component;
an electronic module assembly inseparably connected to the mechanical component and including:
a housing;
a mounting frame disposed in the housing;
an electronic module secured to the mounting frame, the electronic module operably connected to the mechanical component via a module cable;
a vibration isolator disposed in the housing to locate and support the mounting frame therein, the vibration isolator configured to vibrationally isolate the electronic module from gas turbine engine vibrations; and
a cover plate secured to the housing, the cover plate secured to the first side of the firewall, while the housing extends from the cover plate through a module opening in the firewall to the second side of the firewall.

20. The gas turbine engine of claim 19, wherein the vibration isolator is one or more of a spring, an elastomeric damper, an air cylinder/piston arrangement or an oil filled cylinder/piston arrangement.

* * * * *